UNITED STATES PATENT OFFICE.

JOHN M. HUGHES, OF BROOKLYN, ASSIGNOR OF ONE-HALF TO EDWARD N. DICKERSON, JR., OF NEW YORK, N. Y.

COMPOUND TABLE-SALT OR CONDIMENT.

SPECIFICATION forming part of Letters Patent No. 352,465, dated November 9, 1886.

Application filed July 18, 1884. Serial No. 138,065. (No specimens.)

*To all whom it may concern:*

Be it known that I, JOHN M. HUGHES, of Brooklyn, New York, have invented a new and useful Mixture of Salt and Phosphate of Lime for Table Use as a Condiment for Seasoning Food, of which the following is a specification.

My improvement consists of a mixture of common table-salt with a comparatively small percentage of finely-powdered phosphate of lime.

My mixture possesses all the palatable characteristics of salt as a condiment for food. It also affords, in the phosphate of lime present in it, one of the chief constituents of bones, and possesses the further useful quality of constantly retaining its granular condition, so that it may always be readily shaken out of the salt-bottles with perforated tops or covers, which are now in general use.

The powdered phosphate of lime may be mixed by any suitable mechanical means with common salt, powdered, or in small crystals, or in granulated condition.

The proportion of phosphate of lime in the mixture may be varied according to the climate in which the condiment is to be used. Thus in a very dry climate one per cent., by weight, of the phosphate of lime will be sufficient to prevent the salt from caking; but for general use I prefer to employ about three per cent. As, however, the phosphate of lime is a valuable food constituent, it may, if desired, be used in still larger proportion.

In preparing my mixture I preferably use the "calcii phosphas præcipitata" of the Dispensatory of the United States of America.

I claim as my invention—

The herein-described mixture as a condiment for table use, the same consisting of common table-salt in granular condition and powdered phosphate of lime.

JOHN M. HUGHES.

Witnesses:
  P. E. DEVY,
  RALPH L. COOK.